United States Patent [19]
Chory

[11] Patent Number: 5,855,471
[45] Date of Patent: Jan. 5, 1999

[54] HELICOPTER ROTOR BRAKE ASSEMBLY

[75] Inventor: Anthony G. Chory, Trumbull, Conn.

[73] Assignee: Sikorsky Aircraft Corporation, Stratford, Conn.

[21] Appl. No.: 876,963

[22] Filed: Jun. 17, 1997

[51] Int. Cl.[6] ................................................... B64C 11/00
[52] U.S. Cl. ..................... 416/169 R; 416/152; 416/32; 188/73.2
[58] Field of Search ........................... 416/169 R, 170 R, 416/152, 32; 188/72.4, 72.5, 73.2

[56] References Cited

U.S. PATENT DOCUMENTS

| | | | |
|---|---|---|---|
| 2,600,715 | 6/1952 | Wheeler | 416/169 R |
| 2,988,176 | 6/1961 | Bois | 188/71.8 |
| 3,129,608 | 4/1964 | Watson | 416/169 R |
| 3,612,444 | 10/1971 | Girard | 244/7 A |
| 5,529,459 | 6/1996 | Pancotti | 416/169 |

Primary Examiner—Edward K. Look
Assistant Examiner—Richard Woo
Attorney, Agent, or Firm—Adam C. Solomon

[57] ABSTRACT

A helicopter rotor brake assembly for arresting rotational movement of a main rotor drive shaft, wherein the helicopter rotor brake assembly is mechanically interconnected with the main rotor drive shaft through a main transmission. The helicopter rotor brake assembly includes a brake disc rotatably mounted about an axis, wherein the brake disc is mechanically interconnected with the main transmission, and wherein the brake disc defines a plane substantially perpendicular to the axis. A bracket is provided for disposal in combination with the brake disc, and comprises a beam member defining a first end and a second end, a first arcuate member connected to the first end of the beam member and disposed substantially co-planar with the plane defined by the brake disc, and a second arcuate member connected to the second end of the beam member and disposed substantially co-planar with the plane defined by the brake disc. A first caliper subassembly is provided for connection to the first arcuate member, and a second caliper subassembly is provided for connection to the second arcuate member, wherein the first caliper subassembly and the second caliper subassembly are operable, in combination, to apply braking forces to the brake disc, and thereby ensuring an arrestation of rotational movement of the main rotor drive shaft.

4 Claims, 7 Drawing Sheets

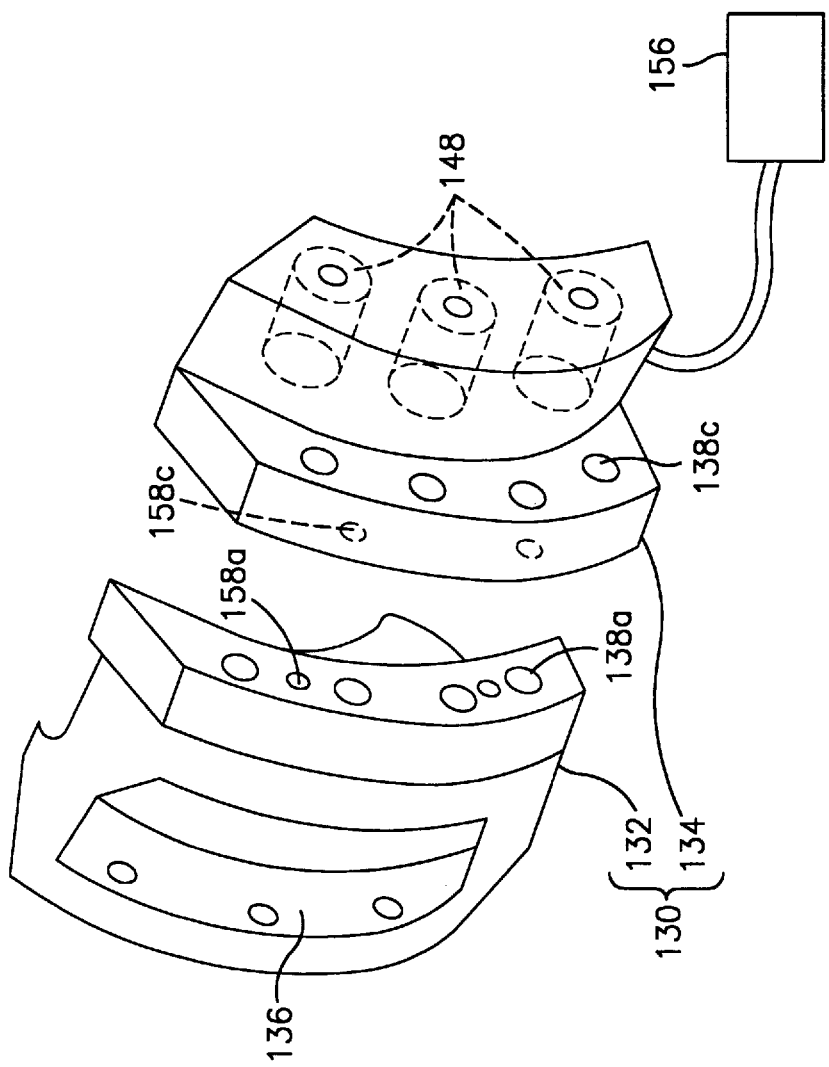

HELICOPTER ROTOR BRAKE ASSEMBLY

TECHNICAL FIELD

This invention relates generally to helicopter rotor brake assemblies, and more particularly, to a helicopter rotor brake assembly including a bracket for integrating an additional caliper subassembly in combination with an existing caliper subassembly to provide increased braking performance.

BACKGROUND ART

Referring to FIG. 1, a main transmission 10 for a Sikorsky Aircraft Corporation BLACK HAWK® (BLACK HAWK® is a registered trademark of the Sikorsky Aircraft Corporation) helicopter (not shown) is depicted in mechanical connectivity with a main rotor drive shaft 12 and a tail take-off flange 14 which is, in turn, connected to a tail rotor drive shaft (not shown). The main transmission 10 contains dual inputs 16 for connecting a pair of turbine engines (not shown) to the main transmission 10, wherein the turbine engines provide torque to the main rotor drive shaft 12 and the tail take-off flange 14 through gearing arrangements (not shown) within the main transmission 10. In addition, a rotor brake assembly 18 is disposed in combination with the main transmission 10, wherein the rotor brake assembly 18 is operable, upon actuation, to arrest rotation of both the main rotor drive shaft 12 and the tail take-off flange 14. However, the configuration of the prior art rotor brake assembly 18 is such that the rotor brake assembly 18 is only capable of arresting rotation of the main rotor drive shaft 12 and the tail take-off flange 14 subsequent to both of the turbine engines being shut-down.

Referring to FIGS. 2 and 3, the prior art rotor brake assembly 18 comprises a split design having a first caliper 20 connected to a second caliper 22 with a plurality of bolts 24. Each caliper 20, 22 includes recesses 26 therein for housing a plurality of hydraulically-actuated pucks 28. The calipers 20, 22 are internally configured for facilitating the flow of hydraulic fluid (not shown) to each of the plurality of hydraulically-actuated pucks 28, wherein the hydraulic fluid is supplied to the calipers 20, 22 through a hydraulic fluid input conduit 34 connected to the first caliper 20. A plurality of aligned apertures 36 are provided in the calipers 20, 22 for facilitating the flow of hydraulic fluid therebetween.

A brake disc 38 is disposed in combination with the calipers 20, 22 such that an arcuate region 40 of the brake disc 38 is interposed between the plurality of hydraulically-actuated pucks 28. The brake disc 38 is mechanically connected to the main transmission 10 such that the brake disc 38 can be urged into rotational movement about an axis 42 in response to torque provided by the main transmission 10. Upon introduction of hydraulic fluid into the calipers 20, 22, the plurality of hydraulically-actuated pucks 28 are actuated such that they are urged into abutting engagement with the arcuate region 40 of the brake disc 38, thereby generating frictional forces therebetween and arresting the rotational movement of the brake disc 38. In operation, the mechanical connectivity between the main transmission 10 and the brake disc 38 is such that arresting the rotation of the brake disc 38 results in an arrestation of the rotational movement of the main rotor drive shaft 12.

As noted above, the prior art rotor brake assembly 18 is only capable of arresting rotation of the main rotor drive shaft 12 subsequent to the turbine engines being shutdown. This is due to the fact that if one or both of the turbine engines are at ground idle, the prior art rotor brake assembly 18 would not be able to react the loads or effectively dissipate the heat generated by an attempt to arrest the rotation of the brake disc 38.

However, there are certain situations wherein it would be advantageous if at least one of the turbine engines was kept at ground idle while the rotational movement of the main rotor drive shaft 12 is arrested. One such situation is when a helicopter lands, e.g. to unload and/or take-on passengers, and then takes off within a relatively short period of time. In that situation, it would be advantageous to keep at least one turbine engine at ground idle such upon release of the rotor brake assembly 18, the main rotor drive shaft 12 would resume rotation, and the other turbine engine could be assisted during its power-up, thereby reducing the time required for getting the main rotor drive shaft 12, and thereby the main rotor blades (not shown) up to the desired rotational speed.

DISCLOSURE OF THE INVENTION

It is therefore an object of the present invention to provide a helicopter rotor brake assembly that is capable of arresting the rotational movement of a main rotor drive shaft with at least one turbine engine at ground idle.

Another object of the present invention is to provide a helicopter rotor brake assembly that is capable of arresting the rotational movement of a main rotor drive shaft with at least one turbine engine at ground idle, wherein the rotor brake assembly utilizes conventional calipers and hydraulically-actuated pucks.

Another object of the present invention is to provide a helicopter rotor brake assembly that is capable of arresting the rotational movement of a main rotor drive shaft with at least one turbine engine at ground idle, wherein the rotor brake assembly can be readily disposed in combination with a conventional main transmission for a helicopter.

These objects and others are achieved in the present invention by a helicopter rotor brake assembly for arresting rotational movement of a main rotor drive shaft, wherein the helicopter rotor brake assembly is mechanically interconnected with the main rotor drive shaft through a main transmission. The helicopter rotor brake assembly includes a brake disc rotatably mounted about an axis, wherein the brake disc is mechanically interconnected with the main transmission, and wherein the brake disc defines a plane substantially perpendicular to the axis. A bracket is provided for disposal in combination with the brake disc, and comprises a beam member defining a first end and a second end, a first arcuate member connected to the first end of the beam member and disposed substantially co-planar with the plane defined by the brake disc, and a second arcuate member connected to the second end of the beam member and disposed substantially co-planar with the plane defined by the brake disc. A first caliper subassembly is provided for connection to the first arcuate member, and a second caliper subassembly is provided for connection to the second arcuate member, wherein the first caliper subassembly and the second caliper subassembly are operable, in combination, to apply braking forces to the brake disc, and thereby ensuring an arrestation of rotational movement of the main rotor drive shaft.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BRIEF DESCRIPTION OF THE DRAWINGS

FIG. 6A is a perspective view of the first caliper subassembly of FIG. 4;

BEST MODE FOR CARRYING OUT THE INVENTION

Figure 4:
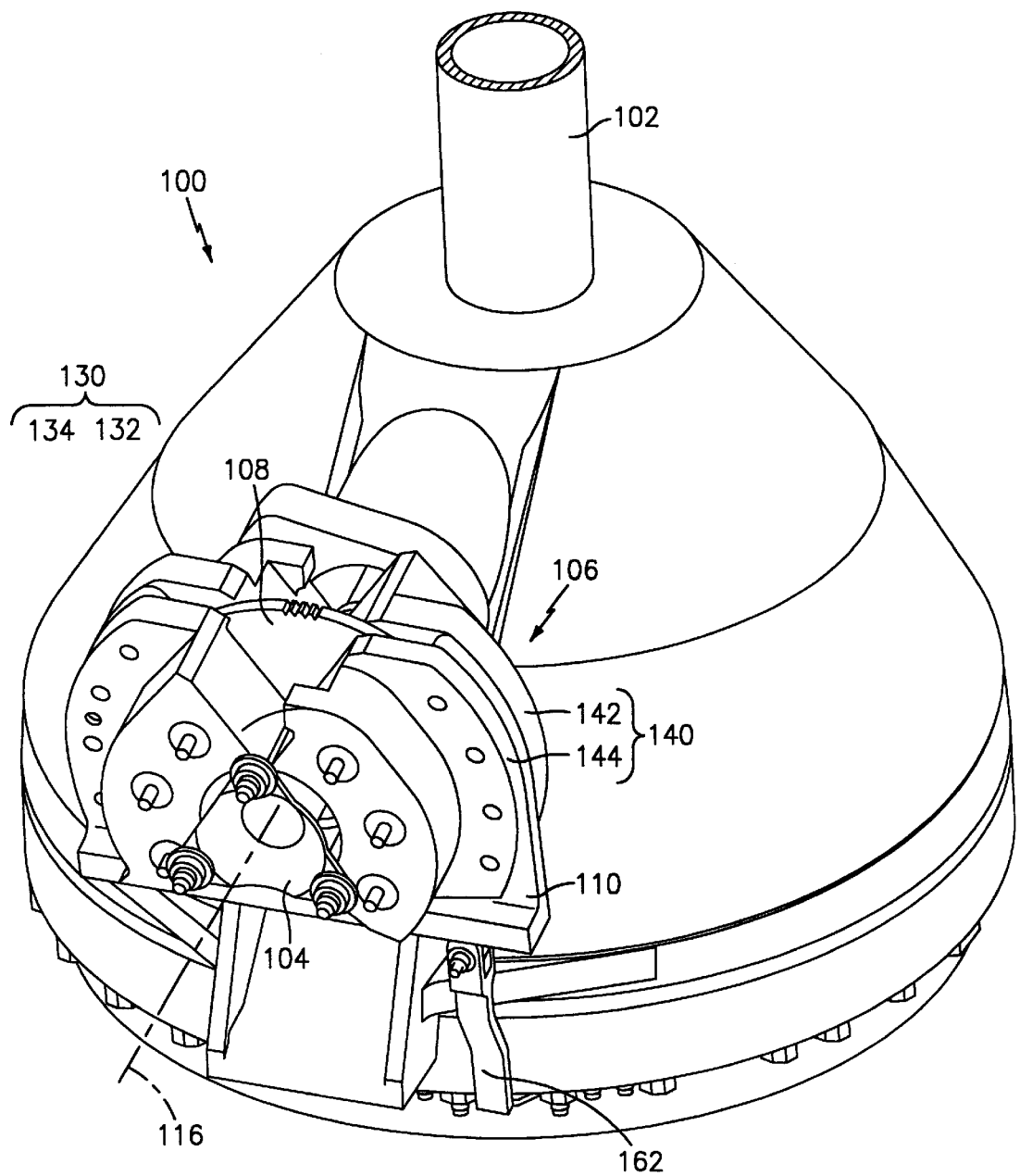
FIG. 4 is a perspective view of a helicopter main transmission depicting a rotor brake assembly embodying features of the present invention.

Referring now to the drawings wherein like reference characters identify corresponding or similar elements throughout the several views, FIG. 4 depicts a main transmission 100 for a Sikorsky Aircraft Corporation BLACK HAWK® helicopter (not shown) connected to a main rotor drive shaft 102, a tail take-off flange 104, and a rotor brake assembly 106 embodying features of the present invention. As is known in the art, the main transmission 100 includes an internal gearing arrangement (not shown) that functions to transmit torque from the helicopter's turbine engines (not shown) to the main rotor drive shaft 102 and the tail take-off flange 104, thereby urging both the main rotor drive shaft 102 and the tail take-off flange 104 into rotational movement.

Figure 1:
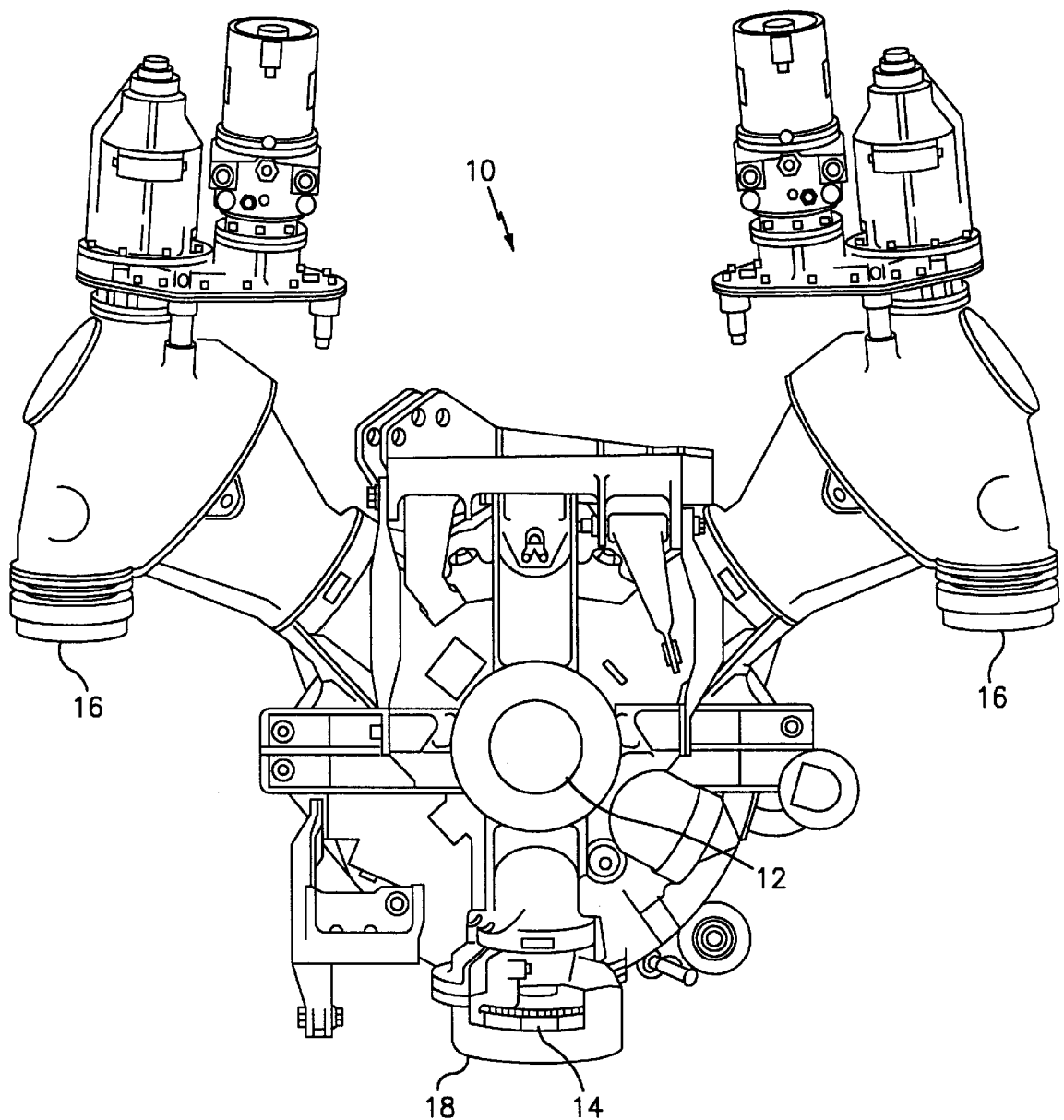
FIG. 1 is a top view of a helicopter main transmission depicting a prior art rotor brake assembly.
Figure 2:
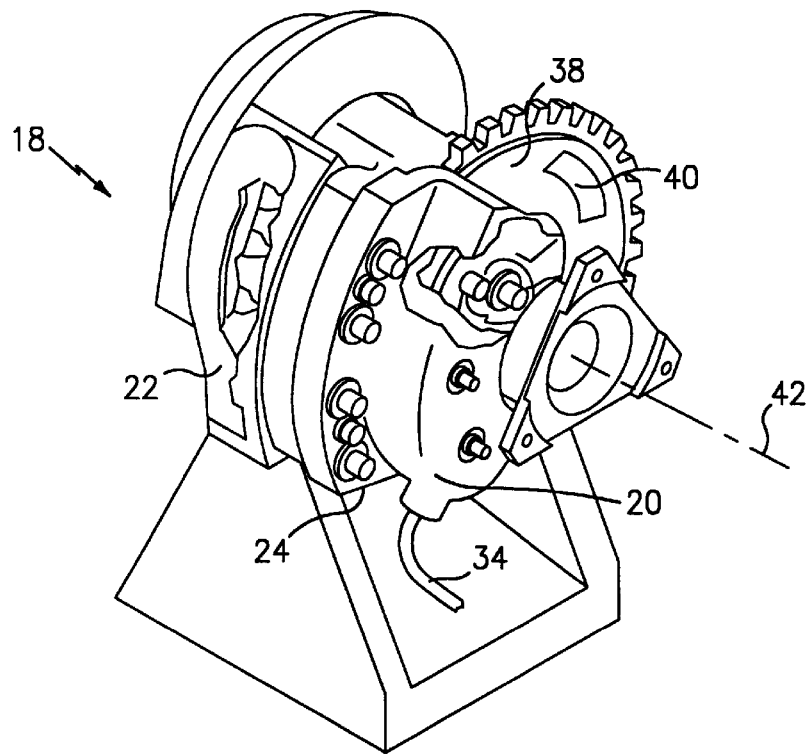
FIG. 2 is a perspective view, partly broken away, of the prior art rotor brake assembly of FIG. 1.
Figure 3:
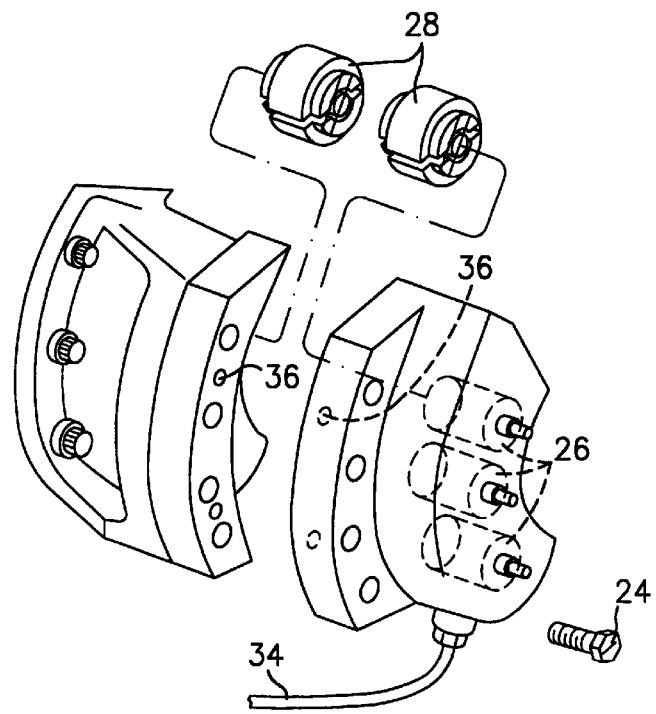
FIG. 3 is a perspective exploded view of the first and second calipers of the prior art rotor brake assembly depicted in FIG. 2.

Referring to FIGS. 4, 5, 6, and 6A, the rotor brake assembly 106 comprises a brake disc 108, a bracket 110, a first caliper subassembly 130, and a second caliper subassembly 140. According to the present invention, the bracket 110 functions as a means for retrofitting prior art rotor brake assemblies (see FIGS. 2 and 3) such that the second caliper subassembly 140 can be disposed in combination with the first caliper subassembly 130, thereby providing increased braking performance.

The brake disc 108 is connected to the tail take-off flange 104, and is configured for rotational movement about an axis 116 in response to torque provided by the rotating tail take-off flange 104. The brake disc 108 defines a plane 118, wherein the plane 118 is substantially perpendicular to the axis 116.

The bracket 110 comprises a beam member 120 defining a first end 122 and a second end 124, a first arcuate member 126 connected to the first end 122, and a second arcuate member 128 connected to the second end 124. The bracket 110 is configured such that both the first arcuate member 126 and the second arcuate member 128 are disposed substantially co-planar with the plane 118 defined by the brake disc 108.

Figure 6:
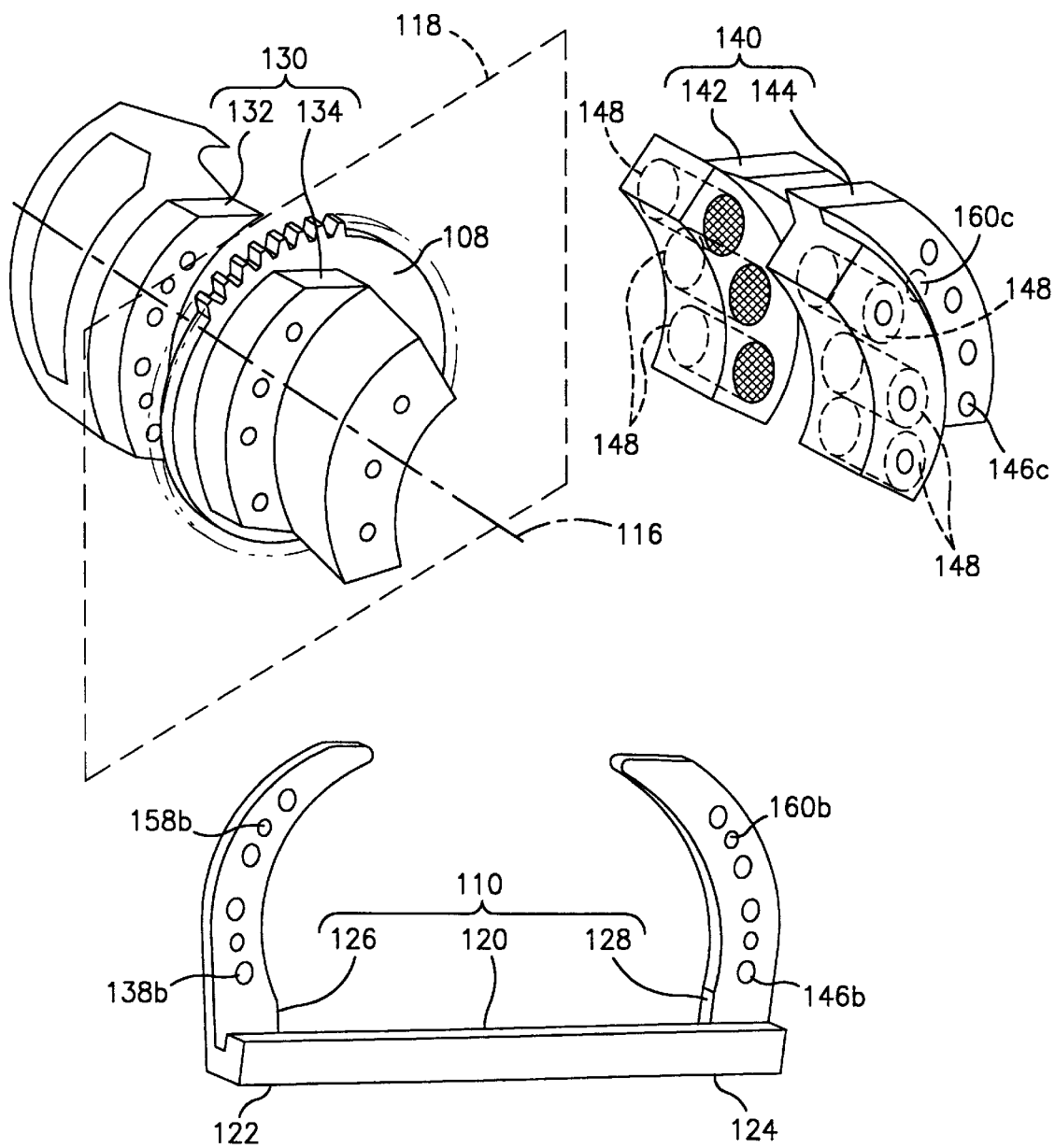
FIG. 6 is a perspective exploded view of the rotor brake assembly of FIG. 4.
Figure 7:
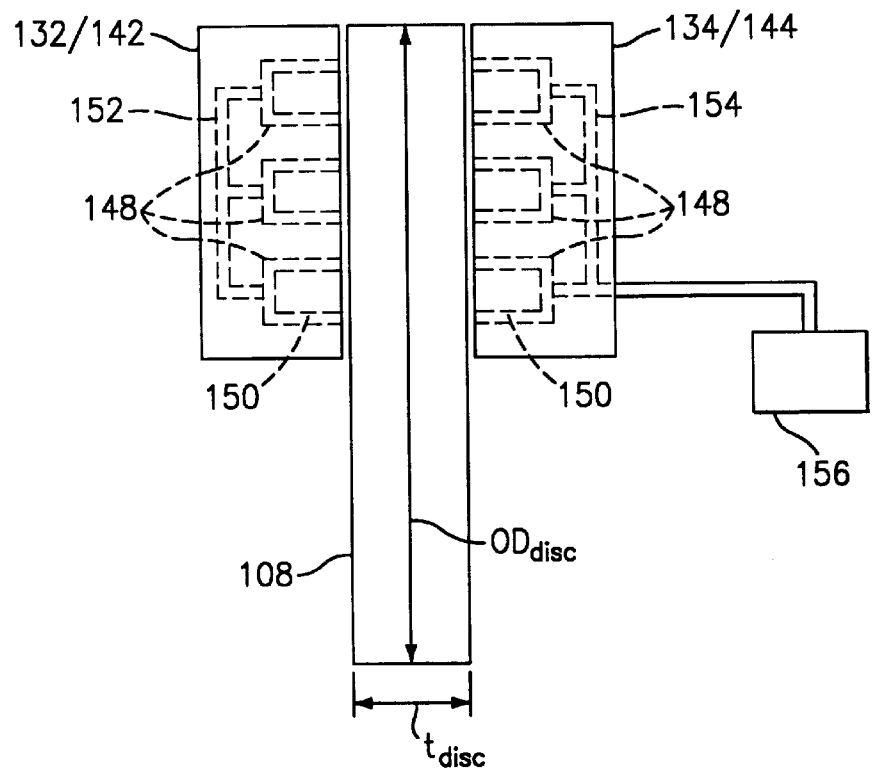
FIG. 7 is a schematic view of the rotor brake assembly depicted in FIG. 4, with the hydraulically-actuated pucks in the disengaged configuration.
Figure 8:
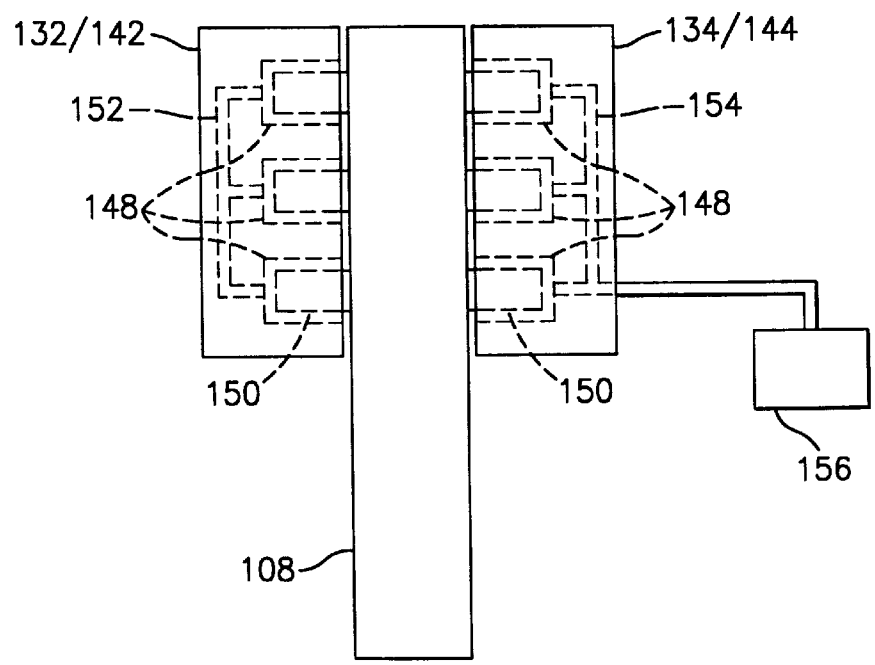
FIG. 8 is a schematic view of the rotor brake assembly depicted in FIG. 4, with the hydraulically-actuated pucks in the engaged configuration.

As depicted in FIGS. 4, 6, and 6A, the first caliper subassembly 130 is connected to both the main transmission 100 and the first arcuate member 126 of the bracket 110, and functions to support the bracket 110 relative to the brake disc 108. Specifically, the first caliper subassembly 130 comprises an inner caliper 132 and an outer caliper 134, wherein the inner caliper 132 includes a flange 136 that is connected to the main transmission 100 with a plurality of bolts (not shown). The inner caliper 132, first arcuate member 126, and outer caliper 134 include a plurality of aligned apertures 138a, 138b, 138c, respectively, formed therein such that when the inner and outer calipers 132, 134 are disposed on opposite sides of the first arcuate member 126, the first caliper subassembly 130 can be bolted to the first arcuate member 126 using a plurality of bolts (not shown) inserted through such apertures.

The second caliper subassembly 140 is connected to the second arcuate member 128 of the bracket 110, and is thereby supported relative to the brake disk 108. Specifically, the second caliper subassembly 140 comprises an inner caliper 142 and an outer caliper 144, wherein the second arcuate member 128 and outer caliper 144 include a plurality of apertures 146b, 146c formed therein and disposed in aligned combination with a plurality of corresponding apertures (occluded in FIG. 6) in the inner caliper 142, such that when the inner and outer calipers 142, 144 are disposed on opposite sides of the second arcuate member 128, the second caliper subassembly 140 can be bolted to the second arcuate member 128 using a plurality of bolts (not shown) inserted through such apertures.

Referring to FIGS. 6, 6A, 7, and 8, the inner calipers 132, 142 and the outer calipers 134, 144 of the first and second caliper subassemblies 130, 140 include a plurality of aligned recesses 148 located proximal to the brake disk 108. A corresponding plurality of hydraulically actuated pucks 150 are disposed within the recesses 148 and are configured in a conventional manner as found in hydraulically-actuated piston assemblies such that the hydraulically actuated pucks 150 are capable of translational linear is movement relative to the brake disk 108 in response to the introduction of hydraulic fluid (not shown) in combination with each of the hydraulically actuated pucks 150. A plurality of hydraulic fluid conduits 152, 154 disposed within the inner calipers 132, 142 and the outer calipers 134, 144, respectively, are provided in fluid communication with a hydraulic fluid source 156, wherein the hydraulic fluid source 156 is capable of introducing the hydraulic fluid in combination with each of the hydraulically actuated pucks 150 such that the hydraulically actuated pucks 150 can be actuated between a disengaged configuration (see FIG. 7) wherein the hydraulically actuated pucks 150 do not make abutting contact with the brake disc 108, and an engaged configuration (see FIG. 8) wherein the hydraulically actuated pucks 150 make abutting contact with the brake disc 108.

A plurality of aligned apertures 158a, 158b, 158c, respectively, are disposed in the inner caliper 132, first arcuate member 126, and the outer caliper 134 in fluid communication with the plurality of hydraulic fluid conduits 152, 154, and are operable to facilitate the flow of hydraulic fluid between the hydraulic fluid conduits 152 in the inner caliper 132 and the hydraulic fluid conduits 154 in the outer caliper 134 of the first caliper subassembly 130. Similarly, a plurality of aligned apertures 160b, 160c, respectively, are disposed in the second arcuate member 128 and the outer caliper 144 in combination with a plurality of corresponding aligned apertures (occluded in FIG. 6) in the inner caliper 142, in fluid communication with the plurality of hydraulic fluid conduits 152, 154, and are operable to facilitate the flow of hydraulic fluid between the hydraulic fluid conduits 152 in the inner caliper 142 and hydraulic fluid conduits 154 in the outer caliper 144 of the second caliper subassembly 140.

It will be appreciated that when the brake disc 108 is being driven into rotational movement by the tail take-off flange 104, and when the hydraulically actuated pucks 150 are actuated into the engaged configuration, the abutting contact of the hydraulically actuated pucks 150 against the rotating brake disc 108 generates frictional forces therebetween of a magnitude sufficient to arrest the rotational movement of the brake disc 108. It will also be appreciated that the mechanical interconnectivity between the brake disc 108 and the main rotor drive shaft 102 through the main transmission 100 is such that upon the arrestation of the rotational movement of the brake disc 108, a corresponding arrestation occurs with respect to the rotational movement of the main rotor drive shaft 102.

In the described embodiment for the BLACK HAWK® helicopter with one engine shut-down and with one engine at ground idle, the brake disc 108 is driven into rotational movement by a torque of approximately 1898 N-m (1400 ft-lbf). Therefore, the configuration of the brake disc 108, and the first and second caliper subassemblies 130, 140 are such that the rotor brake assembly 106 is capable of effectively reacting that torque. Specifically, the brake disc 108 is formed from steel and has an outer diameter $OD_{disc}$ of approximately 26.03 cm (10.25 inches) and a thickness $t_{disc}$ of approximately 2.8 cm (1.1 inches). This thickness $t_{disc}$ of the brake disc 108 is approximately twice the thickness of the prior art brake disc, whereby this thickness facilitates absorption of the heat generated by the frictional forces between the hydraulically actuated pucks 150 and the rotating brake disc 108 in the described embodiment. Accordingly, an additional feature of the present invention is that the first arcuate member 126 and the second arcuate member 128 function as spacers or "shims" between the inner calipers 132, 142 and their corresponding outer calipers 134, 144, respectively, such that the first caliper assembly 130 and the second caliper assembly 140 are each properly positioned about the brake disc 108.

Figure 5:
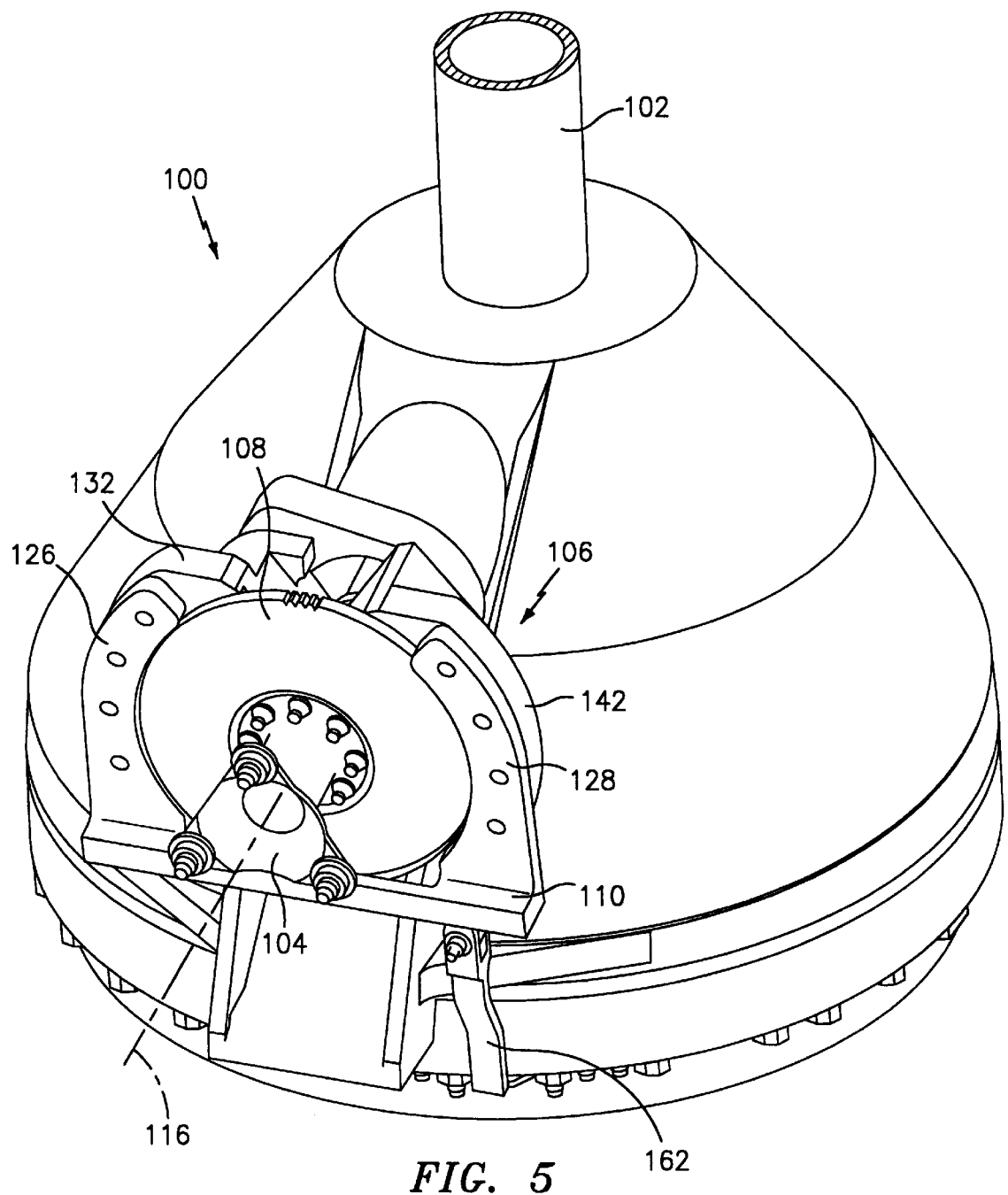
FIG. 5 is a perspective view, partly broken away, of the rotor brake assembly of FIG. 4.

Each of the caliper subassemblies 130, 140 includes three pairs of the opposed hydraulically actuated pucks 150, wherein the hydraulically actuated pucks 150 are formed from steel and resinous materials. The hydraulic fluid source 156, hydraulic fluid conduits 152, 154, and hydraulically-actuated pucks 150 are all configured such that a hydraulic fluid pressure between approximately 1379 kPa (200 psi) and 2068 kPa (300 psi) is delivered to the hydraulically-actuated pucks 150. In addition, as depicted in FIGS. 4 and 5, a rigid member 162 is connected to the bracket 110 (proximal to the second arcuate member 128) and to the main transmission 100 such that the rigid member 162 functions to react torsional loads experienced by the bracket 110 due to the frictional forces generated between the second caliper subassembly 140 and the brake disc 108 during braking.

It will be appreciated that in alternative embodiments, the configuration of the brake disc 108, the bracket 110, and the first and second caliper subassemblies 130, 140 can differ from those in the described embodiment to meet the operational requirements of a particular helicopter.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A helicopter rotor brake assembly for arresting rotational movement of a main rotor drive shaft, said helicopter rotor brake assembly being mechanically interconnected with said main rotor drive shaft through a main transmission, said helicopter rotor brake assembly comprising:

(a) a brake disc rotatably mounted about an axis, said brake disc being mechanically interconnected with said main transmission, said brake disc defining a plane, whereby said plane is substantially perpendicular to said axis;

(b) a bracket disposed in combination with said brake disc, said bracket comprising
a beam member defining a first end and a second end,
a first arcuate member connected to said first end of said beam member and disposed substantially co-planar with said plane defined by said brake disc, and
a second arcuate member connected to said second end of said beam member and disposed substantially co-planar with said plane defined by said brake disc;

(c) a first caliper subassembly connected to said first arcuate member; and (d) a second caliper subassembly connected to said second arcuate member;

(e) said first caliper subassembly and said second caliper subassembly being operable, in combination, to apply braking forces to said brake disc, whereby application of said braking forces to said brake disc ensures an arrestation of rotational movement of said main rotor drive shaft.

2. The helicopter rotor brake assembly of claim 1, wherein said first caliper subassembly comprises:

(a) opposed calipers connected to said first arcuate member, said opposed calipers having a plurality of aligned recesses therein;

(b) a plurality of hydraulically-actuated pucks disposed in combination within said plurality of aligned recesses; and (c) a hydraulic fluid source connected in fluid communication with said plurality of hydraulically-actuated pucks, said hydraulic fluid source being capable of delivering hydraulic fluid to said plurality of hydraulically-actuated pucks;

(d) said plurality of hydraulically-actuated pucks being capable of assuming an engaged configuration wherein said plurality of hydraulically-actuated pucks make abutting contact with said brake disc, and a disengaged configuration wherein said plurality of hydraulically-actuated pucks do not make abutting contact with said brake disc, whereby said plurality of hydraulically-actuated pucks are actuated between said engaged configuration and said disengaged configuration in response to delivery of said hydraulic fluid to said plurality of hydraulically-actuated pucks.

3. The helicopter rotor brake assembly of claim 1, wherein said second caliper subassembly comprises:

(a) opposed calipers connected to said second arcuate member, said opposed calipers having a plurality of aligned recesses therein;

(b) a plurality of hydraulically-actuated pucks disposed in combination within said plurality of aligned recesses; and (c) a hydraulic fluid source connected in fluid communication with said plurality of hydraulically-actuated pucks, said hydraulic fluid source being capable of delivering hydraulic fluid to said plurality of hydraulically-actuated pucks;

(d) said plurality of hydraulically-actuated pucks being capable of assuming an engaged configuration wherein said plurality of hydraulically-actuated pucks make abutting contact with said brake disc, and a disengaged configuration wherein said plurality of hydraulically-actuated pucks do not make abutting contact with said brake disc, whereby said plurality of hydraulically-actuated pucks are actuated between said engaged configuration and said disengaged configuration in response to delivery of said hydraulic fluid to said plurality of hydraulically-actuated pucks.

4. In a helicopter rotor brake assembly for arresting rotational movement of a brake disc, the brake disc defining a plane and having a first caliper subassembly disposed in combination therewith, the improvement comprising a bracket for integrating a second caliper subassembly in combination with the brake disc, said bracket comprising:

(a) a first arcuate member configured for connection to the first caliper subassembly and for disposal substantially co-planar with the plane defined by the brake disc;

(b) a second arcuate member configured for connection to the second caliper subassembly and for disposal substantially co-planar with the plane defined by the brake disc; and (c) a beam member defining a first end and a second end, said first end being connected to said first arcuate member and said second end being connected to said second arcuate member;

(d) whereby said first caliper subassembly and said second caliper subassembly are operable, in combination, to apply braking forces to said brake disc, thereby ensuring an arrestation of rotational movement of said brake disc.

\* \* \* \* \*